Patented June 12, 1945

2,378,365

UNITED STATES PATENT OFFICE 2,378,365

COATING COMPOSITIONS CONTAINING METHYL METHACRYLATE

Robert C. Swain, Riverside, and Pierrepont Adams, Stamford, Conn., assignors to American Cyanamid Company, New York, N. Y., a corporation of Maine No Drawing. Application October 31, 1940, Serial No. 363,678

4 Claims. (Cl. 260—42)

This invention relates to coating compositions containing polymeric methyl methacrylate and melamine-formaldehyde resins.

An object of this invention is to improve the physical and chemical properties of coating compositions containing polymeric methyl methacrylate, e. g., heat resistance, solvent resistance, chemical resistance, etc.

Another object of this invention is to provide compositions containing polymeric methyl methacrylate and compatible proportions of compatible melamine-formaldehyde resins.

These and other objects are attained by blending polymeric methyl methacrylate with not more than about 30% (total solids weight basis) of a melamine-formaldehyde resin which has been alkylated with an alcohol containing 4 to 8 carbon atoms and wherein the molal ratio of formaldehyde to melamine is at least about 4:1.

The following examples in which the proportions are in parts by weight are given by way of illustration and not in limitation. The polymeric methyl methacrylate used in the following examples is a product sold under the trade name "Lucite" (hard grade) by the E. I. du Pont de Nemours Company.

Example 1

| | Parts |
|---|---|
| Melamine-formaldehyde resin "A" | 10 |
| Polymeric methyl methacrylate ("Lucite") | 90 |

A composition containing these ingredients is prepared by admixing 20 parts of melamine-formaldehyde resin "A" solution (50% resin) with 450 parts of "methyl methacrylate stock solution" (containing 20% of polymeric methyl methacrylate ("Lucite") and 80% of ethylene dichloride). Films of the composition are applied to metal objects and baked at a temperature of about 135° C. for about one-half hour. The product is a hard, transparent coating having good film strength.

Example 2

| | Parts |
|---|---|
| Melamine-formaldehyde resin "B" | 25 |
| Polymeric methyl methacrylate ("Lucite") | 75 |

A composition containing these ingredients is prepared by admixing 50 parts of melamine-formaldehyde resin "B" solution (50% resin) with 375 parts of "methyl methacrylate stock solution." Films of the composition are applied to metal objects and baked at a temperature of about 135° C. for about one-half hour. A clear, tough film is formed.

Example 3

| | Parts |
|---|---|
| Melamine-formaldehyde resin "C" | 10 |
| Polymeric methyl methacrylate ("Lucite") | 90 |

A composition containing these ingredients is prepared by admixing 20 parts of melamine-formaldehyde resin "C" solution (50% resin) with 450 parts of "methyl methacrylate stock solution." Films of the composition are applied to metal objects and baked at a temperature of about 135° C. for about one-half hour. The product formed is a very hard, clear coating.

Example 4

| | Parts |
|---|---|
| Melamine-formaldehyde resin "D" | 25 |
| Polymeric methyl methacrylate ("Lucite") | 75 |

A composition containing these ingredients is prepared by admixing 50 parts of melamine-formaldehyde resin "D" solution (50% resin) with 375 parts of "methyl methacrylate stock solution." Films of the composition are applied to metal objects and baked at a temperature of about 135° C. for about one-half hour. A water-white film having good chemical properties is formed.

Example 5

| | Parts |
|---|---|
| Melamine-formaldehyde resin "E" | 10 |
| Polymeric methyl methacrylate ("Lucite") | 90 |

A composition containing these ingredients is prepared by admixing 20 parts of melamine-formaldehyde resin "E" solution (50% resin) with 450 parts of "methyl methacrylate stock solution." Films of the composition are applied to metal objects and baked at a temperature of about 135° C. for about one-half hour. A hard, transparent film is produced.

Example 6

| | Parts |
|---|---|
| Melamine-formaldehyde resin "F" | 25 |
| Polymeric methyl methacrylate ("Lucite") | 75 |

A composition containing these ingredients is prepared by admixing 50 parts of melamine-formaldehyde resin "F" solution (50% resin) with 375 parts of "methyl methacrylate stock solution." Films of the composition are applied to metal objects and baked at a temperature of about 135° C. for about one-half hour, to give a smooth transparent finish.

Preparation of melamine-formaldehyde resin "A"

| | Parts |
|---|---|
| Melamine (1 mol) | 126 |
| Formalin (4 mols) (37% formaldehyde in water) | 324.4 |
| n-Butanol | 440 |

This mixture is placed in a reflux apparatus which is provide with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91-93° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. During the distillation about 550 additional parts of butanol are added gradually. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

Preparation of melamine-formaldehyde resin "B"

| | Parts |
|---|---|
| Melamine (1 mol) | 126 |
| Formalin (5 mols) (37% formaldehyde in water) | 405.5 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91-93° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. During the distillation about 550 additional parts of butanol are added gradually. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

Preparation of melamine-formaldehyde resin "C"

| | Parts |
|---|---|
| Melamine (1 mol) | 126 |
| Formalin (5 mols) (37% formaldehyde in water) | 486.6 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91-93° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. During the distillation about 550 additional parts of butanol are added gradually. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

Preparation of melamine-formaldehyde resin "D"

| | Parts |
|---|---|
| Melamine (1 mol) | 126 |
| Formalin (5 mols) (37% formaldehyde in water) | 405.5 |
| n-Hexyl alcohol | 500 |
| Methyl alcohol | 200 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 80-85° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. This solution is essentially a hexylated resin in hexyl alcohol, all or nearly all of the methanol having been elminated from it during the distillation. The resulting resin solution may be diluted to about 50% solids with any desired solvent or diluent, e. g., xylene.

Preparation of melamine-formaldehyde resin "E"

| | Parts |
|---|---|
| Melamine-formaldehyde (molal ratio 1:4) spray-dried powder | 200 |
| 2-Ethyl hexanol | 280 |
| n-Butanol | 320 |
| Methyl acid phosphate | 4 |

The melamine-formaldehyde condensation product is obtained by refluxing melamine and formalin (37% formaldehyde in water) in the molal ratio of 1:4 at a pH of about 7-9 for about 3 hours and then spray-drying.

The spray-dried melamine-formaldehyde powder, octanol, butanol and methyl acid phosphate are heated to about 100-105° C. in 30 minutes and refluxed about 30 minutes. This solution is vacuum concentrated at about 50-70° C. to form a product containing about 50% solids.

*Preparation of melamine-formaldehyde resin "F"*

|  | Parts |
|---|---|
| Melamine (1 mol) | 126 |
| Formalin (5 mols) (37% formaldehyde in water) | 405.5 |
| Benzyl alcohol | 600 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 93-95° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

Alkylated melamine-formaldehyde resins may be produced in accordance with the procedures outlined above, as well as in any other suitable manner. Aqueous syrups of melamine-formaldehyde resins may be first produced and then alkylated either simultaneously with dehydration or subsequent to dehydration. Generally the simultaneous condensation of melamine, formaldehyde and a suitable alcohol is used because of convenience. In order to facilitate the alkylation with the higher alcohols, e. g., the amyl alcohols, hexyl alcohols and the octanols, a low boiling alcohol such as methanol or butanol may be mixed with the higher alcohol, thereby assisting in removing the water and causing the reaction to take place readily at somewhat lower temperatures than would otherwise be required. The low boiling alcohol is removed by distillation after the reaction is completed. Another method for producing resins alkylated with higher alcohols comprises alkylating the melamine-formaldehyde resin with a low boiling alcohol such as methanol, subsequently replacing it with the desired higher alcohol and distilling out the low boiling alcohol. The condensation may be carried out either with or without an acid catalyst and in some instances basic catalysts may desirably be utilized.

The melamine-formaldehyde resins vary slightly according to minor variations in control during their production and in some instances small proportions of a suitable solvent material, e. g., chloroform, ethylene dichloride, ethyl acetate, acetone, toluene, xylene, etc., may be added to the original solutions of polymeric methyl methacrylate and melamine-formaldehyde resin in order to produce perfectly clear solutions if such solutions are not originally obtained.

While formaldehyde has been used in the previous examples, it will be obvious that the various polymers of formaldehyde, e. g., paraformaldehyde, or substances which yield formaldehyde may be used in place of part or all of the formaldehyde.

As indicated by the above examples polymeric methyl methacrylate is compatible with melamine-formaldehyde resins wherein the molal ratio of formaldehyde to melamine is at least about 4:1 if not more than about 30% of the melamine resin is mixed with the polymeric methyl methacrylate. In some instances slightly higher proportions of melamine resin are compatible with polymeric methyl methacrylate. For example, a melamine-formaldehyde resin which is butylated and wherein the molal ratio of formaldehyde to melamine is 5:1 or 6:1 is compatible in proportions up to about 75% of melamine resin. Similarly, a melamine resin which is alkylated with octyl alcohol and wherein the molal ratio of formaldehyde to melamine is at least 4:1 is compatible in proportions up to about 50%. Melamine-formaldehyde resins which are alkylated with benzyl alcohol and which have a molal ratio of formaldehyde to melamine of at least 5:1 are compatible in all proportions with polymeric methyl methacrylate. While higher ratios of formaldehyde to melamine than 6:1 may be used, it is generally undesirable inasmuch as formaldehyde is lost during the curing so that usually the product in its cured condition does not contain more than about 6 mols of formaldehyde to 1 mol of melamine. The percentage composition in each instance in this paragraph is on a total solids weight basis.

The resins may be alkylated with any alcohol containing from 4 to 8 carbon atoms. The term "alkylated melamine-formaldehyde resin" is intended to denote compositions which are reacted with an alcohol.

Other grades of polymeric methyl methacrylate may be used in place of the hard grade used in the above examples and also other esters of methacrylic acid may be substituted for part or all of the methyl methacrylate e. g., ethyl methacrylate, propyl methacrylate, butyl methacrylate, etc.

Our products may be plasticized with a wide variety of materials such as the alkyl phthalates, tricresyl phosphate, various alkyd resins, particularly the fatty oil acid modified alkyd resins, etc.

Various fillers, pigments, dyes and lake may be added to our compositions, e. g., lithopone, zinc oxide, titanium oxide, ferric oxide, Prussian blue, toluidine red, malachite green, mica, glass fibers, ground glass, powdered silica, etc.

Curing catalysts may be incorporated in the compositions to effect a more rapid curing of the melamine-formaldehyde resins or to enable the resin to be cured at lower temperatures than indicated in the above examples. Such substances are, for instance, phosphoric acid, ammonium salts of phosphoric acid, etc.

Other resinous compositions may be included in various coating compositions, e. g., urea-formaldehyde resins, phenol - formaldehyde resins, ethyl cellulose, cellulose acetate, nitrocellulose, alkyd resins, etc.

Our mixed products have very desirable properties such as light resistance, chemical resistance, heat resistance, etc. Our products show improved resistance to solvents as compared to polymeric methyl methacrylate compositions not containing melamine-formaldehyde resins.

Our compositions are especially useful in coating paper and cloth, particularly in the production of electrical insulation inasmuch as our compositions have excellent electrical properties. Our products are also useful in the manufacture of paints, lacquers, varnishes and the like. Furthermore, our mixtures may be used in the production of safety glass and also as adhesives for many other purposes.

The term "compatible" as used herein is intended to denote compositions, films of which are clear and homogeneous after baking.

Obviously many modifications and variations in the processes and compositions described above may be made without departing from the spirit and scope of the invention as defined in the appended claims.

We claim:

1. A coating composition containing polymeric methyl methacrylate and a melamine-formaldehyde resin which has been reacted with an alcohol containing 4 to 8 carbon atoms, wherein the molal ratio of formaldehyde to melamine is at least about 4:1 and wherein the ratio by weight of melamine-formaldehyde resin to the methacrylate is not greater than about 3:7.

2. A coating composition containing polymeric methyl methacrylate and a melamine-formaldehyde resin which has been reacted with n-butanol, wherein the molal ratio of formaldehyde to melamine is at least about 4:1 and wherein the ratio by weight of melamine-formaldehyde resin to the methacrylate is not greater than about 3:7.

3. A coating composition containing polymeric methyl methacrylate and a melamine-formaldehyde resin which has been reacted with 2-ethyl hexanol wherein the molal ratio of formaldehyde to melamine is at least about 4:1 and wherein the ratio by weight of melamine-formaldehyde resin to the methacrylate is not greater than about 3:7.

4. A coating composition containing polymeric methyl methacrylate and a melamine-formaldehyde resin which has been reacted with benzyl alcohol, wherein the molal ratio of formaldehyde to melamine is at least about 4:1 and wherein the ratio by weight of melamine-formaldehyde resin to the methacrylate is not greater than about 3:7.

ROBERT C. SWAIN.
PIERREPONT ADAMS.

---

CERTIFICATE OF CORRECTION.

Patent No. 2,378,365.           June 12, 1945.

ROBERT C. SWAIN, ET AL.

It is hereby certified that error appears in the printed specification of the above numbered patent requiring correction as follows: Page 2, first column, line 72, for "(5 mols)" read --(6 mols)--; and that the said Letters Patent should be read with this correction therein that the same may conform to the record of the case in the Patent Office.

Signed and sealed this 25th day of September, A. D. 1945.

Leslie Frazer (Seal)         First Assistant Commissioner of Patents.

positions not containing melamine-formaldehyde resins.

Our compositions are especially useful in coating paper and cloth, particularly in the production of electrical insulation inasmuch as our compositions have excellent electrical properties. Our products are also useful in the manufacture of paints, lacquers, varnishes and the like. Furthermore, our mixtures may be used in the production of safety glass and also as adhesives for many other purposes.

The term "compatible" as used herein is intended to denote compositions, films of which are clear and homogeneous after baking.

Obviously many modifications and variations in the processes and compositions described above may be made without departing from the spirit and scope of the invention as defined in the appended claims.

We claim:

1. A coating composition containing polymeric methyl methacrylate and a melamine-formaldehyde resin which has been reacted with an alcohol containing 4 to 8 carbon atoms, wherein the molal ratio of formaldehyde to melamine is at least about 4:1 and wherein the ratio by weight of melamine-formaldehyde resin to the methacrylate is not greater than about 3:7.

2. A coating composition containing polymeric methyl methacrylate and a melamine-formaldehyde resin which has been reacted with n-butanol, wherein the molal ratio of formaldehyde to melamine is at least about 4:1 and wherein the ratio by weight of melamine-formaldehyde resin to the methacrylate is not greater than about 3:7.

3. A coating composition containing polymeric methyl methacrylate and a melamine-formaldehyde resin which has been reacted with 2-ethyl hexanol wherein the molal ratio of formaldehyde to melamine is at least about 4:1 and wherein the ratio by weight of melamine-formaldehyde resin to the methacrylate is not greater than about 3:7.

4. A coating composition containing polymeric methyl methacrylate and a melamine-formaldehyde resin which has been reacted with benzyl alcohol, wherein the molal ratio of formaldehyde to melamine is at least about 4:1 and wherein the ratio by weight of melamine-formaldehyde resin to the methacrylate is not greater than about 3:7.

ROBERT C. SWAIN.
PIERREPONT ADAMS

---

CERTIFICATE OF CORRECTION.

Patent No. 2,378,365.  June 12, 1945.

ROBERT C. SWAIN, ET AL.

It is hereby certified that error appears in the printed specification of the above numbered patent requiring correction as follows: Page 2, first column, line 72, for "(5 mols)" read --(6 mols)--; and that the said Letters Patent should be read with this correction therein that the same may conform to the record of the case in the Patent Office.

Signed and sealed this 25th day of September, A. D. 1945.

Leslie Frazer (Seal)  First Assistant Commissioner of Patents.